United States Patent
Pticyn et al.

(10) Patent No.: US 10,308,216 B2
(45) Date of Patent: Jun. 4, 2019

(54) IMMOBILIZER ARRANGEMENT FOR A MOTOR VEHICLE, MOTOR VEHICLE AND METHOD FOR ACTUATING AN IMMOBILIZER ARRANGEMENT

(71) Applicant: GM GLOBAL TECHNOLOGY OPERATIONS LLC, Detroit, MI (US)

(72) Inventors: Evgenij Pticyn, Ruesselsheim (DE); Gerwen Simon, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 187 days.

(21) Appl. No.: 15/481,095

(22) Filed: Apr. 6, 2017

(65) Prior Publication Data

US 2017/0291578 A1    Oct. 12, 2017

(30) Foreign Application Priority Data

Apr. 7, 2016    (DE) .......................... 10 2016 004 218

(51) Int. Cl.
| | |
|---|---|
| *B60R 25/08* | (2006.01) |
| *B60R 25/20* | (2013.01) |
| *B60T 7/16* | (2006.01) |
| *B60T 13/74* | (2006.01) |
| *B60T 17/22* | (2006.01) |

(52) U.S. Cl.
CPC .............. *B60R 25/08* (2013.01); *B60R 25/20* (2013.01); *B60T 7/16* (2013.01); *B60T 13/741* (2013.01); *B60T 17/22* (2013.01)

(58) Field of Classification Search
CPC ......... B60R 25/08; B60R 17/22; B60T 17/22; B60T 13/741; B60T 7/16
See application file for complete search history.

(56) References Cited

U.S. PATENT DOCUMENTS

| | | | | |
|---|---|---|---|---|
| 5,357,182 A | * | 10/1994 | Wolfe | ................... B62B 5/0423 188/1.12 |
| 5,539,641 A | * | 7/1996 | Littlejohn | ............. B60T 8/1764 303/152 |
| 5,909,174 A | * | 6/1999 | Dietz | ................... B60Q 11/002 340/468 |
| 5,953,196 A | * | 9/1999 | Zimmermann | .......... G05G 5/12 307/101 |

(Continued)

FOREIGN PATENT DOCUMENTS

DE    102008036636 A1    12/2009

OTHER PUBLICATIONS

German Patent Office, German Search Report for German Application No. 102016004218.4, dated Nov. 29, 2016.

*Primary Examiner* — Mary Cheung
(74) *Attorney, Agent, or Firm* — Lorenz & Kopf, LLP

(57) ABSTRACT

An immobilizer arrangement for a motor vehicle includes a brake that can be electrically actuated by at least one motor. The motor is controlled by a brake control, and with an immobilizer control that serves for activating and deactivating the immobilizer of the motor vehicle. The immobilizer control is configured to receive an authorization for deactivating the immobilizer from a user identification device. With the brake serving as the immobilizer, at least one current path is provided for actuating the motor, which is coupled to the immobilizer control.

13 Claims, 2 Drawing Sheets

(56) References Cited

U.S. PATENT DOCUMENTS

| | | | |
|---|---|---|---|
| 6,406,102 B1 * | 6/2002 | Arnold | B60T 7/042 303/20 |
| 6,709,069 B2 | 3/2004 | Riddiford et al. | |
| 6,816,059 B2 | 11/2004 | Yanaka | |
| 2002/0108411 A1 * | 8/2002 | Cardwell | B60R 25/005 70/226 |
| 2004/0188193 A1 * | 9/2004 | Fulks | B60T 13/02 188/156 |
| 2006/0009901 A1 * | 1/2006 | Pasquet | B60T 7/08 701/70 |
| 2010/0026084 A1 | 2/2010 | Risse et al. | |

* cited by examiner

IMMOBILIZER ARRANGEMENT FOR A MOTOR VEHICLE, MOTOR VEHICLE AND METHOD FOR ACTUATING AN IMMOBILIZER ARRANGEMENT

CROSS-REFERENCE TO RELATED APPLICATION

This application claims priority to German Patent Application No. 102016004218.4, filed Apr. 7, 2016, which is incorporated herein by reference in its entirety.

TECHNICAL FIELD

The present disclosure pertains to an immobilizer arrangement, a motor vehicle and a method for actuating an immobilizer arrangement.

BACKGROUND

Immobilizers are devices on motor vehicles that are intended to prevent their unauthorized use. One generally distinguishes between electronic and mechanical immobilizers.

Electronic immobilizers are required by law in many countries. These electronic immobilizers include, among other things, so-called three-circuit interceptors that short-circuit the ignition, the fuel supply and the starter with the aid of a relay. Other known electronic immobilizers access the engine control unit and issue a clearance, without which the engine will not start. The communication of corresponding clearances usually takes place via a bus system of the motor vehicle and is encrypted. Immobilizers are frequently unlocked by radio transmitters that are typically integrated into keys—in the colloquial sense—of the motor vehicle and act as transponders. The communication may take place in encrypted or unencrypted form.

Mechanical immobilizers may consist, for example, of steering wheel clamps, steering wheel locks, wheel boots or the like. In addition, immobilizers may also feature a mechanical component such as, for example, a steering wheel locking system that is controlled by the immobilizer control and blocks the further use of a motor vehicle steering system. The incorporation of a mechanical immobilizer requires a certain vehicle complexity that increases the development effort, as well as the costs of the motor vehicle.

SUMMARY

The present disclosure provides enhanced immobilizer arrangements, motor vehicles and methods for actuating immobilizer arrangements in such a way that a mechanical immobilizer solution can be realized more cost-efficiently than previously possible. The present disclosure concerns an immobilizer arrangement for a motor vehicle with a brake that can be electrically actuated by at least one motor. The motor is controlled by a brake control and with an immobilizer control that serves for activating and deactivating the immobilizer of the motor vehicle. The immobilizer control is configured to receive an authorization for deactivating the immobilizer from a user identification device and the brake serves as the immobilizer. At least one current path is provided for actuating the motor, which is coupled to the immobilizer control.

Many motor vehicles feature brakes that can be actuated electrically. The corresponding motor, which is frequently referred to as actuator, may be realized centrally for several brakes. The brakes are in this case frequently coupled to the motor by a cable control. In other known brake systems, an actuator is alternatively assigned to an individual wheel brake. It is known to arrange such an actuator on the brake caliper. Corresponding systems may be provided additionally or alternatively to hydraulic brake systems.

Since the corresponding motor for actuating the brake is coupled to the immobilizer, the corresponding brake can be used as a mechanical immobilizer that mechanically prevents motor vehicle from moving. Due to the fact that the current path is furthermore influenced by the immobilizer control, a current flow required for disengaging the corresponding brake can be blocked as long as no clearance signal has been received. The corresponding brake can be disengaged in order to drive away the motor vehicle once a corresponding clearance signal has been received after the reception of an authorization for deactivating the immobilizer from the user identification device. In this case, the filter circuit is integrated into at least one brake caliper of the brake and/or into the motor of the brake.

A corresponding user identification device may be realized in the form of a transmitter, particularly in the form of a radio transmitter. A corresponding radio transmitter can also fulfill other function such as, for example, unlocking or locking a corresponding motor vehicle and starting the motor vehicle. Corresponding transmitters frequently are colloquially referred to as keys. The authorization may take place in unencrypted or in encrypted form and be suitably received by the immobilizer control in dependence on the transmission path in the form of communication via a bus system, such that the immobilizer can release the current path for actuating the motor of the brake. Due to the arrangement of the filter circuit near the motor, the filter circuit can be prevented from being bypassed in order to thereby deactivate the immobilizer. Furthermore, the corresponding filter circuit can be adequately encapsulated in the brake caliper or in the motor such that mechanical access to the filter circuit is aggravated.

In a first enhancement of the immobilizer arrangement, the current path may feature a filter circuit that is coupled to the immobilizer control and distinguishes between the current path for actuating the motor in the disengaging direction of the brake and for actuating the motor in the engaging direction of the brake.

A corresponding filter circuit enables the immobilizer to allow an actuation of the motor of the brake in the engaging direction of the brake, but to prevent an actuation of the motor in the disengaging direction of the brake, under all circumstances, i.e. in the activated or deactivated state of the immobilizer. Consequently, the brake can be engaged under all circumstances, but not disengaged when the immobilizer is activated. This is helpful in situations, in which an authorization cannot take place, but a brake has to be actuated for safety reasons, for example in a roll-away vehicle.

In another potential embodiment, the filter circuit may block the current path for actuating the motor of the brake in the disengaging direction of the brake when the immobilizer is activated. In this way, the motor cannot be acted upon with a current for actuating the motor in the disengaging direction when the immobilizer is activated. The brake is prevented from being disengaged due to the fact that the motor can no longer be actuated in the disengaging direction.

In an enhancement, the filter circuit may not block the current path for actuating the motor in the engaging direction. The required independence can therefore be achieved by decoupling a potential actuation of the motor in the engaging direction of the brake from the state of the immobilizer.

In a further enhancement, the filter circuit may feature a blocking diode for distinguishing between the current path for actuating the motor of the brake in the disengaging direction and for actuating the motor of the brake in the engaging direction of the brake. A corresponding blocking diode is only conductive for potential differences in the predefined direction (current flow direction) such that a current flow in the opposite direction can be blocked. The corresponding diode can therefore generate separate current paths for the two actuating directions of the motor of the brake.

In an enhancement, the filter circuit may feature a microprocessor. A corresponding microprocessor can realize the communication with the immobilizer control and therefore release the current path for actuating the motor of the brake in the disengaging direction. In this case, the microprocessor may serve as a switch itself or actuate a switch.

In another enhancement, the filter circuit may be connected to the brake control via a bus system. In this way, control commands for actuating the motor of the brake can be transmitted from a vehicle control unit to the brake.

In another enhancement, the brake may include a parking brake. Parking brakes are frequently equipped with corresponding motors in order to allow an electric actuation of the parking brake.

In another aspect, the present disclosure concerns a motor vehicle with an immobilizer arrangement of the above-described type. A corresponding motor vehicle makes it possible to realize a mechanically acting immobilizer without requiring an additional mechanical device such as, for example, a steering system lock such that the constructive effort and the number of required components are reduced and in turn lead to cost and weight savings.

In a first enhancement, the motor for actuating the parking brake may be arranged on the brake caliper of the parking brake. In this way, the immobilizer is prevented from being bypassed.

In yet another aspect, the present disclosure concerns a method for actuating an immobilizer arrangement, particularly an immobilizer arrangement of the above-described type. A current path for actuating the motor in the disengaging direction of the brake is released when the immobilizer is deactivated by the immobilizer control. Due to the release of the current path of the motor of the brake in the disengaging direction, the brake can be disengaged such that the motor vehicle can be driven; vice versa, the brake can be prevented from being disengaged when the immobilizer is activated.

In a first enhancement, the current path for actuating the motor of the brake in the disengaging direction may be blocked when the immobilizer arrangement is activated. In this way, a current flow for disengaging the parking brake is blocked.

In another enhancement, a deactivation of the immobilizer may be carried out by an immobilizer control. In another enhancement, the motor may be actuated in the engaging direction when the immobilizer is activated.

In another aspect, the present disclosure a device for actuating an immobilizer arrangement of the above-described type. A releasing device is provided in order to release a current path for actuating the motor in the disengaging direction of the brake when a deactivating device of the immobilizer is actuated. The releasing device is coupled to the immobilizer control.

In a first enhancement, a blocking device may be provided in order to block the current path for actuating the motor in the disengaging direction when the immobilizer is activated. In another enhancement, a deactivating device may be provided in order to deactivate the immobilizer by an immobilizer control. In another enhancement, an actuating device may be provided in order to actuate the motor in the engaging direction of the brake when the immobilizer is activated.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
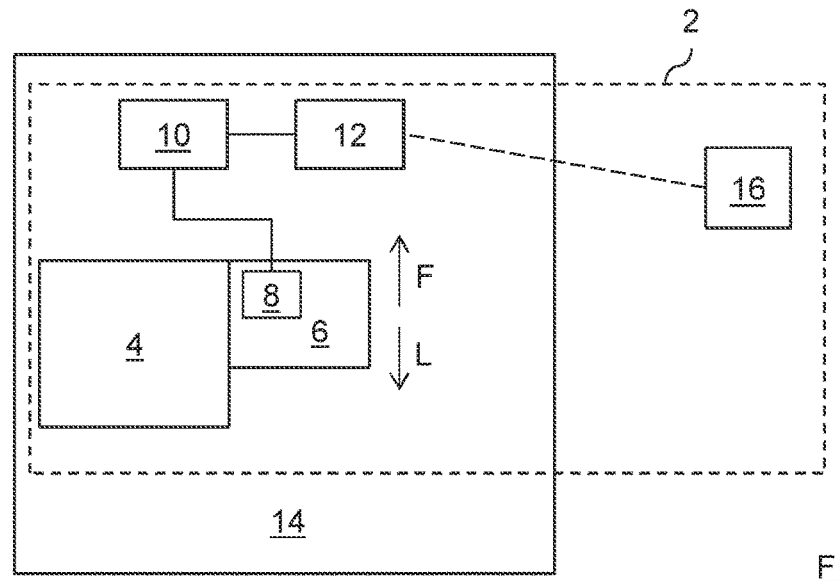
FIG. 1 shows a block diagram of the immobilizer arrangement in the deactivated and activated state of the immobilizer.

FIG. 1 shows a block diagram of an immobilizer arrangement 2 (framed with broken lines). The immobilizer arrangement 2 features a brake 4 with a motor 6 for electrically actuating the brake 4. The motor 6 is arranged on the brake 4 and mechanically coupled to a not-shown brake piston of a not-shown brake caliper of the brake 4.

The motor 6 is equipped with a filter circuit 8 that distinguishes between current paths for actuating the motor 6 in the disengaging direction L and in the engaging direction F. The motor 6 is connected to a brake control 10, by which the motor 6 can be actuated in a disengaging direction L and the opposite engaging direction F. The brake control 10 causes these oppositely directed actuations due to a voltage reversal of an actuating or control voltage.

The immobilizer arrangement 2 furthermore features an immobilizer control 12, wherein immobilizer functions of a motor vehicle 14, which are installed in the immobilizer arrangement 2, can be activated with the aid of this immobilizer control. Such immobilizer functions may be realized, for example, by deactivating an ignition or a starter. The immobilizer control 12 is connected to the filter circuit 8 such that the filter circuit 8 can release or block a current path for actuating the motor 6 in the disengaging direction L. The filter circuit 8 is described in greater detail below with reference to FIG. 2.

The immobilizer control 12 is actuated by a user identification device 16 such that the immobilizer can be deactivated in the presence of the user identification device 16. If the user identification device 16 is not located within the transmission range of the motor vehicle 14, the immobilizer remains activated and the motor 6 cannot be actuated in the engaging direction F.

A check for the presence of the user identification device 16 is carried out at several points in time such as, for example, when a door of the motor vehicle 14 is actuated, when the engine status changes (starting or shutting off the engine of the motor vehicle 14), when the doors are closed (displaced) and, depending on the respective design, regularly during the operation of the motor vehicle.

Figure 2:
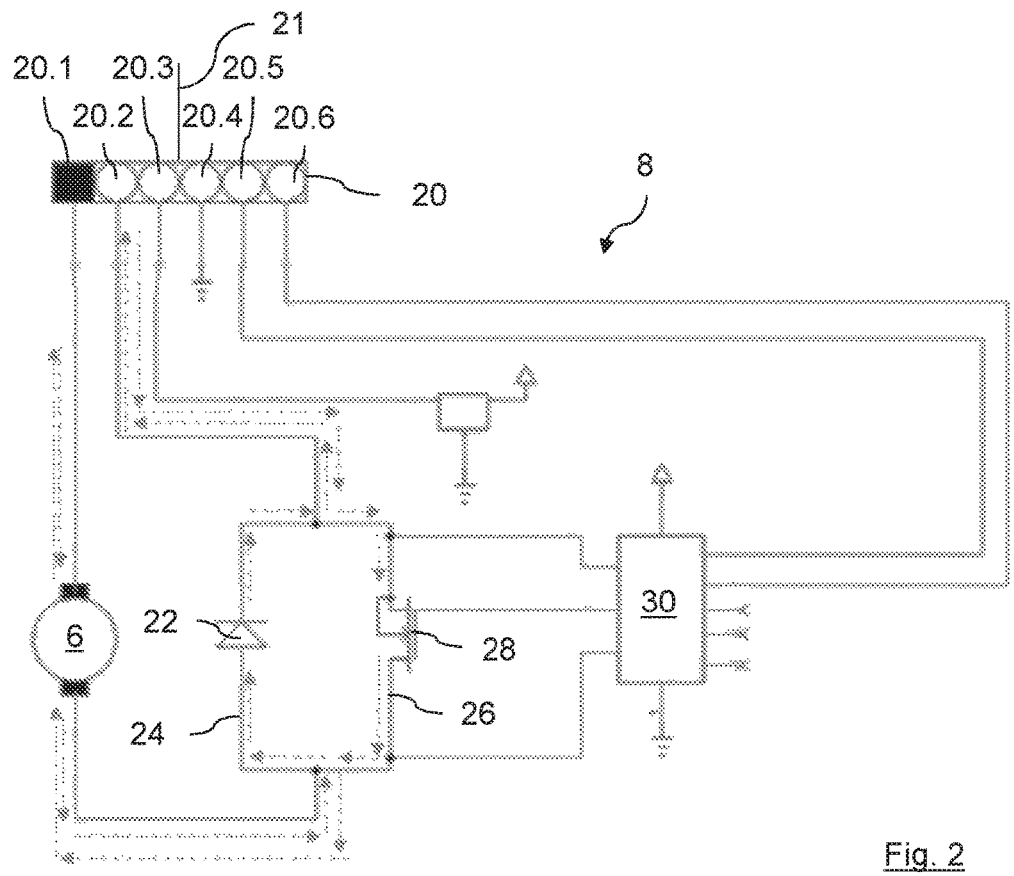
FIG. 2 shows a circuit diagram of a filter circuit.

FIG. 2 shows a circuit diagram of the filter circuit 8. The filter circuit 8 features a connection 20 to a bus system 21 with several pins 20.1-20.6. The pins are allocated differently. The filter circuit is connected to the (not-shown) brake control 10 by the pins 20.1, 20.2. The motor 6 is inserted into the thusly formed current path. The aforementioned current paths are formed by a diode 22 that only conducts a current in one direction. A first current path 24 is formed from the pin 20.1 to the pin 20.2 via the motor 6 and the diode 22. A second current path 26 is formed from the pin 20.1 to the pin 20.2 via the motor 6 and a switch 28.

The switch 28 is opened and closed by a microprocessor 30, wherein the microprocessor 30 is connected to the immobilizer control 12 via the pins 20.5 and 20.6. When the switch 28 is in the open position, no current can flow along the second current path 26 and the motor 6 cannot be actuated in the disengaging direction L. Vice versa, the motor 6 can be actuated in the engaging direction F along the current path 24 at any time regardless of the state of the immobilizer. The communication between the microprocessor 30 and the immobilizer control 12 may take place in encrypted form.

Figure 3:
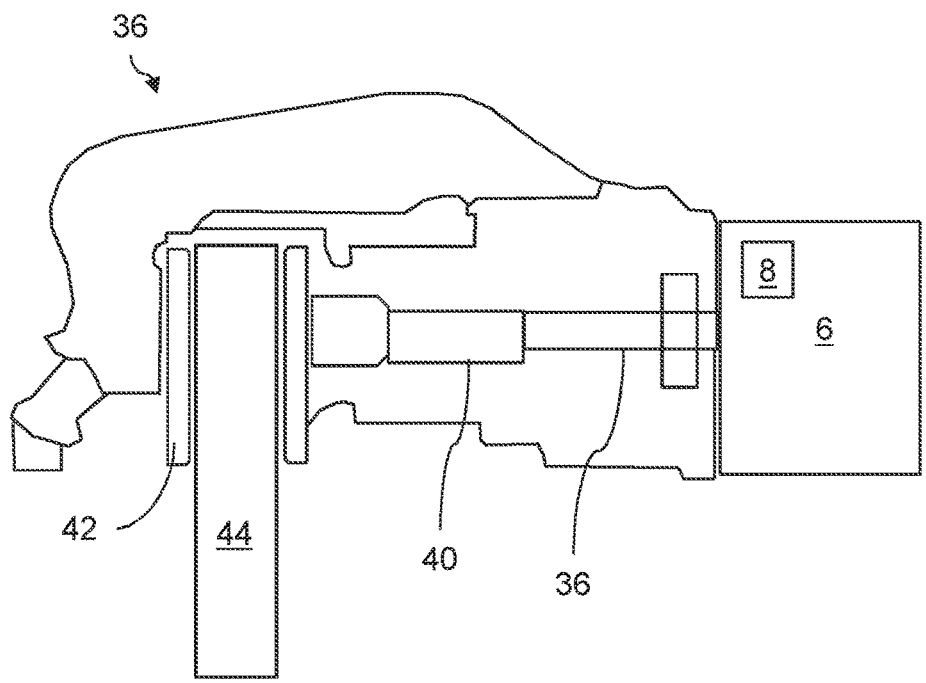
FIG. 3 shows a cross section through a brake with the filter circuit.

FIG. 3 shows a cross section through a brake caliper 36 that can be used as a parking brake. The motor 6 is arranged on the brake caliper 36. The motor 6 can actuate a brake piston 40, which presses friction linings 42 against a brake rotor 44, by a shaft 38. This can serve for activating the parking brake. The filter circuit 8 is integrated into the brake caliper 36 and cannot be bypassed. The filter circuit 8 can be prevented from being bypassed due to the encrypted transmission of information from the immobilizer control 12 to the filter circuit 8. The filter circuit 8 likewise cannot be bypassed because it is embedded in the brake caliper 36.

Figure 4:
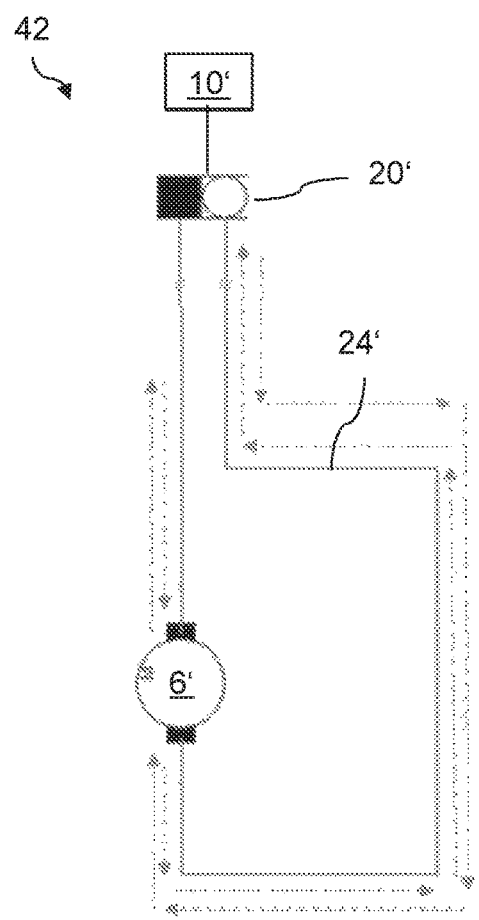
FIG. 4 shows a circuit diagram according to the prior art.

FIG. 4 shows a parking brake 42 according to the prior art. In this case, a motor 6' is connected to a brake control 10' via a connection 20', wherein the same current path 24' is used for both actuating directions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An immobilizer arrangement for a motor vehicle comprising:
   a motor configured to actuate a brake;
   a brake control configured to operate the motor in an engaging direction and a disengaging direction that is opposite the engaging direction, the brake control configured to reverse an actuating voltage across the motor to cause oppositely directed actuations of the motor in the engaging direction and the disengaging direction;
   an immobilizer control operable to selectively activate and deactivate an immobilizer, wherein the brake serves as the immobilizer to immobilize the vehicle when the immobilizer is activated, the immobilizer control configured to receive an authorization for deactivating the immobilizer from a user identification device; and
   a filter circuit that electrically connects the motor to the brake control and the immobilizer control, the filter circuit including a first current path and a second current path, the first current path and the second current path electrically connected to the motor;
   the first current path including a one-way element that conducts current in a single direction;
   the second current path including a switch that is electrically connected in-parallel to the one-way element;
   the switch being closed when the immobilizer is deactivated, the switch being open when the immobilizer is activated;
   the filter circuit, when the immobilizer is deactivated, allowing current to flow via the first path to operate the motor in the engaging direction and, alternatively, allowing current to flow via the second path to operate the motor in the disengaging direction; and
   the filter circuit, when the immobilizer is activated, allowing current to flow via the first path to operate the motor in the engaging direction and blocking current flow via the first path to prevent actuation of the motor in the disengaging direction.

2. The immobilizer arrangement according to claim 1, wherein the one-way element of the filter circuit comprises a blocking diode.

3. The immobilizer arrangement according to claim 1, wherein the filter circuit comprises a microprocessor.

4. The immobilizer arrangement according to claim 1, further comprising a bus system connecting the filter circuit to the brake control.

5. The immobilizer arrangement according to claim 1, wherein the immobilizer comprises a parking brake.

6. The immobilizer arrangement according to claim 1, wherein the immobilizer comprises a parking brake.

7. A method for actuating an immobilizer arrangement comprising:
   providing an immobilizer arrangement that comprises:
      a motor configured to actuate a brake;
      a brake control configured to operate the motor in an engaging direction and a disengaging direction that is opposite the engaging direction, the brake control configured to reverse an actuating voltage across the motor to cause oppositely directed actuations of the motor in the engaging direction and the disengaging direction;
      an immobilizer control operable to selectively activate and deactivate an immobilizer, wherein the brake serves as the immobilizer to immobilize the vehicle when the immobilizer is activated, the immobilizer control configured to receive an authorization for deactivating the immobilizer from a user identification device; and
      a filter circuit that electrically connects the motor to the brake control and the immobilizer control, the filter circuit including a first current path and a second current path, the first current path and the second current path electrically connected to the motor;
      the first current path including a one-way element that conducts current in a single direction;
      the second current path including a switch that is electrically connected in-parallel to the one-way element;

the switch being closed when the immobilizer is deactivated, the switch being open when the immobilizer is activated;

the filter circuit, when the immobilizer is deactivated, allowing current to flow via the first path to operate the motor in the engaging direction and, alternatively, allowing current to flow via the second path to operate the motor in the disengaging direction; and the filter circuit, when the immobilizer is activated, allowing current to flow via the first path to operate the motor in the engaging direction and blocking current flow via the first path to prevent actuation of the motor in the disengaging direction;

opening the switch to activate the immobilizer and to block current flow via the first path to prevent actuation of the motor in the disengaging direction; and closing the switch to deactivate the immobilizer and to allow current to flow via the first path to operate the motor in the engaging direction and, alternatively, to allow current to flow via the second path to operate the motor in the disengaging direction.

8. The method according to claim 7, further comprising selectively changing the immobilizer between activated and deactivated with the immobilizer control.

9. An immobilizer arrangement for a motor vehicle comprising:

an actuator configured to actuate a brake;

a brake control configured to operate the actuator in an engaging direction and a disengaging direction that is opposite the engaging direction, the brake control configured to reverse an actuating voltage across the actuator to cause oppositely directed actuations of the actuator in the engaging direction and the disengaging direction;

an immobilizer control operable to selectively activate and deactivate an immobilizer, wherein the brake serves as the immobilizer to immobilize the vehicle when the immobilizer is activated, the immobilizer control configured to receive an authorization for deactivating the immobilizer from a user identification device; and a filter circuit that electrically connects the actuator to the brake control and the immobilizer control, the filter circuit including a first current path and a second current path, the first current path and the second current path electrically connected to the actuator;

the first current path including a one-way element that conducts current in a single direction;

the second current path including a switch that is electrically connected in-parallel to the one-way element;

the switch being closed when the immobilizer is deactivated, the switch being open when the immobilizer is activated;

the filter circuit, when the immobilizer is deactivated, allowing current to flow via the first path to operate the actuator in the engaging direction and, alternatively, allowing current to flow via the second path to operate the actuator in the disengaging direction; and the filter circuit, when the immobilizer is activated, allowing current to flow via the first path to operate the actuator in the engaging direction and blocking current flow via the first path to prevent actuation of the actuator in the disengaging direction.

10. The immobilizer arrangement of claim 9, wherein the actuator is an electric motor.

11. The immobilizer arrangement of claim 9, wherein the one-way element of the filter circuit comprises a blocking diode.

12. The immobilizer arrangement of claim 9, wherein the filter circuit comprises a microprocessor.

13. The immobilizer arrangement according to claim 9 further comprising a bus system connecting the filter circuit to the brake control.

* * * * *